Figure 1:
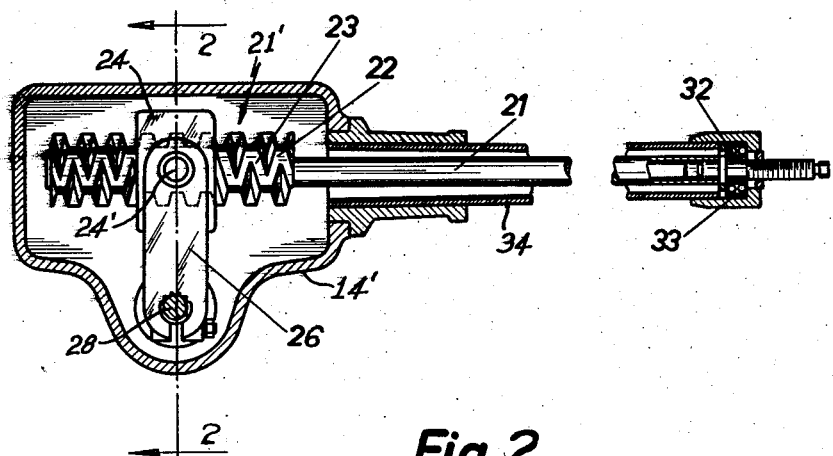

July 7, 1953            K. RABE            2,644,341

STEERING MECHANISM FOR MOTOR VEHICLES AND THE LIKE

Filed June 13, 1951

INVENTOR
*Karl Rabe*

BY

ATTORNEYS

Patented July 7, 1953

2,644,341

UNITED STATES PATENT OFFICE 2,644,341

STEERING MECHANISM FOR MOTOR VEHICLES AND THE LIKE

Karl Rabe, Stuttgart, Germany, assignor, by mesne assignments, to Dr. Ing. h. c. F. Porsche K. G., Stuttgart-Zuffenhausen, Germany, a corporation of Germany Application June 13, 1951, Serial No. 231,325
In Germany June 19, 1950

3 Claims. (Cl. 74—499)

This invention relates to improvements in mechanism for steering motor vehicles and similar applications in which motion applied to a steering shaft is transmitted in a novel manner and individually from the steering shaft to the two opposite vehicle wheels of a vehicle to be canted or turned.

In known types of spindle operated steering mechanisms, motion is transmitted from the steering shaft through a pitman shaft and arm to a drag link which is connected to a tie rod mechanism interconnecting the two opposite wheels of the vehicle to be turned. In many cases these structures are inconvenient and take up valuable space.

The primary object of the present invention is to provide a new steering mechanism in which the usual tie rods and certain associated mechanism are eliminated.

A further object of the invention is to provide a new steering mechanism in which some of the bearings normally associated with the steering shaft are eliminated.

According to the invention, the disadvantages referred to are overcome and the objects are attained by providing a steering mechanism in which the steering shaft in the steering gear housing is provided with or includes a worm consisting of two intersecting threads of the same inclination or pitch but extending in opposite directions, and a pair of nut segments engaging the threads of the worm on opposite sides of the shaft, the threads of the nut segments being opposite to each other so that when the steering shaft is rotated or turned on its axis, the nut segments are moved in opposite directions along the worm. The nut segments are respectively flexibly connected to levers attached to steering lever shafts or pitman shafts extending from the steering gear housing, each of which carry a pitman arm. The ends of the pitman arms are respectively connected by drag links to conventional type steering arms operatively associated with the oppositely mounted vehicle wheels to be turned by the steering mechanism.

The pitman shafts or steering lever shafts are pivotally mounted on a common axis thereby providing a compact arrangement and the necessity of a relatively small steering gear housing. In this construction, the steering shaft or spindle is pivotally supported at one end only, as for example, at the end of the steering column adjacent the steering wheel, in which case, the end of the steering shaft in the housing will be supported only by the nut segments. When the shaft is supported in this way, it may be rocked at the same time that it is turned, thereby preventing any jamming of the nut segments, regardless of the position to which they are moved.

The steering mechanism of the present invention includes other features and advantages described more in detail hereinafter in connection with the accompanying drawings forming a part of this application and illustrating two constructional forms of the invention.

Figure 2:
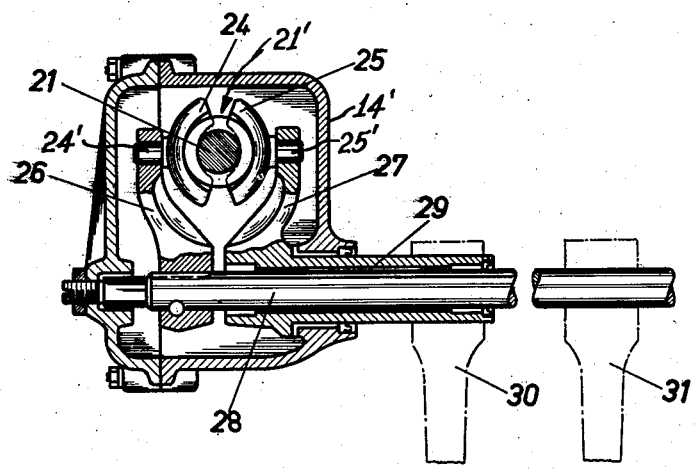

In the drawings:

Fig. 1 is a broken side sectional view of a steering mechanism constructed in accordance with the present invention; and Fig. 2 is a broken sectional view taken along the plane of the line 2—2 of Fig. 1.

Referring to the drawings, the steering mechanism includes a steering shaft 21 which is provided with or includes a worm 21' comprising two intersecting threads 22 and 23 of the same pitch and construction, but extending in opposite directions. These threads are respectively engaged by nut segments 24 and 25, which are flexibly supported by levers 26 and 27, respectively. The nut segments 24 and 25 each embraces approximately, but less than one-half of the circumferential surface of the threaded portion of the shaft 21 around which the segments extend, and they carry stub pivot shafts 24' and 25', respectively, which engage in pivot sockets or openings in the levers 26 and 27. The lever 26 is fixed to a pitman or steering shaft 28, while the lever 27 is fixed to a hollow steering or pitman shaft 29 which embraces the shaft 28. The shafts 28 and 29 extend coaxially in the same direction through the housing 14' of the steering gear and respectively carry steering levers or pitman arms 31 and 30. The pitman arms 30 and 31 operate drag links of known type, respectively connected to the conventional steering arms mounted rigidly with respect to the pivoted stub axle carriers of the type normally used for the front wheels of motor vehicles.

When the steering shaft 21 is turned in one direction by the steering wheel of the vehicle, one of the nut segments will move upwardly along the worm 21' of the shaft 21 and the other nut segment will move downwardly. In this operation the stub pivot shafts 24' and 25' of the nut segments pivot in the levers 26 and 27 and move slightly around the worm 21'. The movements will rotate the pitman shafts 28 and 29 in opposite directions to pull one of the drag links of the vehicle and push the other. The operation is such that the steering arms are moved in opposite directions and the wheels turned in the same direction. The steering of the vehicle is thus effected in a simple and space saving manner.

The construction shown in Figs. 1 and 2 is particularly suitable for vehicles, in which the driver sits at the side of the vehicle, as in the case of agricultural tractors, rather than at a position between the vehicle wheels. This arrangement therefore, provides a construction in which the steering rod lever or pitman arm 30 can be mounted on the left side of the vehicle and the steering rod lever or pitman arm 31 on the right-hand side of the vehicle. This type of steering arrangement is particularly suitable for heavy vehicles.

One of the important features of the construction shown in Figs. 1 and 2 is that the steering shaft 21 is supported at one end only, that is, by the bearing 32 mounted at the upper end of the steering column 34. The bearing 32 is so constructed that the steering shaft is not only capable of turning but also of performing a rocking motion which is permitted by giving the running surface 33 of the outer race ring of the bearing 32 a suitable oval shape in cross-section. The threaded end of the steering shaft 21 is not supported by a bearing but is guided only by the oppositely mounted nut segments 24 and 25 which substantially embrace the worm of the shaft at their points of engagement and thereby eliminate one of the bearings usually employed in steering gear mechanisms. The absence of any bearing for the lower end of the steering shaft 21 prevents jamming of the nut segments 24 and 25 when the levers 26 and 27 are rocked in opposite directions. Springs, not shown, of the plate type, may be employed around the steering shafts 28 and 29 inside of the casing 14' for urging the levers 26 and 27 and the nut segments carried thereby toward each other so that the nut segments are pressed against the threads of the worm 21'.

The steering gear mechanism of the present invention is applicable to all kinds of motor vehicles, such as tractors, trailers, motor cars, and buses, and to other applications.

What I claim is:

1. A steering mechanism for a motor vehicle including a steering shaft and a housing into which one end of the shaft extends, a single bearing for the shaft located outside the housing, said bearing having a running surface permitting pivoting of the steering shaft, means for transmitting the motion of the steering shaft comprising a worm on the shaft in the housing including two similar opposite intersecting threads, two similar nut segments of opposite thread respectively engaging the two threads of the worm, a pair of pitman shafts extending into the housing, and a pair of levers in the housing respectively fixed to said shafts and respectively engaging and holding said nut segments, the end of the steering shaft extending into the housing being supported solely by the nut segments, said nut segments being movable in opposite directions along said worm when the steering shaft is rotated, thereby rotating the pitman shafts in opposite directions with respect to each other.

2. A mechanism of the type described, including a shaft to be rotated, a housing into which one end of the shaft extends, means for transmitting the motion of the shaft comprising a worm on the shaft in the housing including two similar opposite intersecting threads, two similar threaded nut segments of opposite thread arranged opposite each other and respectively engaging the two threads of the worm, each threaded nut segment embracing about one half the circumference of the worm, a pair of pitman shafts extending into the housing, and a pair of levers in the housing respectively fixed to said pitman shafts and respectively pivotally engaging and holding said threaded segments against the worm, the shaft carrying the worm being supported solely by a bearing remote from the portion of the shaft in the housing and by the nut segments engaging the threads of the worm thereby permitting the portion of the shaft in the housing to rock as well as rotate, said threaded segments being movable in opposite directions along said worm when the shaft is rotated, thereby rotating the pitman shafts in opposite directions with respect to each other.

3. A steering mechanism as claimed in claim 1, in which said single bearing for the steering shaft is located adjacent the opposite end of the shaft, whereby the portion of the shaft in the housing is free to rock when the two nut segments are moved toward and away from each other by the rotation of the steering shaft.

KARL RABE.

References Cited in the file of this patent

UNITED STATES PATENTS

| Number | Name | Date |
|---|---|---|
| 1,718,582 | Rodd | June 25, 1929 |
| 1,723,537 | Wright | Aug. 6, 1929 |
| 1,918,667 | Renaux et al. | July 18, 1933 |

FOREIGN PATENTS

| Number | Country | Date |
|---|---|---|
| 887,295 | France | Nov. 9, 1943 |
| 951,845 | France | Nov. 4, 1949 |